US008433835B2

(12) United States Patent
Kazama

(10) Patent No.: US 8,433,835 B2
(45) Date of Patent: Apr. 30, 2013

(54) INFORMATION PROCESSING SYSTEM AND CONTROL METHOD THEREOF

(75) Inventor: Atsushi Kazama, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 278 days.

(21) Appl. No.: 12/923,676

(22) Filed: Oct. 4, 2010

(65) Prior Publication Data

US 2011/0082956 A1    Apr. 7, 2011

(30) Foreign Application Priority Data

Oct. 6, 2009 (JP) .................................. 2009-232541

(51) Int. Cl.
*G06F 13/16* (2006.01)
*G06F 13/42* (2006.01)
*G06F 13/00* (2006.01)
*G06F 12/00* (2006.01)

(52) U.S. Cl.
USPC ............ 710/107; 710/105; 710/110; 711/167

(58) Field of Classification Search ............. 710/11, 710/74, 105–107, 110; 711/100, 154, 167–169
See application file for complete search history.

(56) References Cited

U.S. PATENT DOCUMENTS

| 4,757,439 A * | 7/1988 | Stinson et al. ................. 711/156 |
| 4,999,620 A * | 3/1991 | Ishii .............................. 345/554 |
| 5,400,292 A * | 3/1995 | Fukiage et al. ........... 365/230.01 |
| 5,404,335 A * | 4/1995 | Tobita ............................ 365/222 |
| 5,426,613 A * | 6/1995 | Takahashi et al. ............. 365/222 |
| 5,475,692 A * | 12/1995 | Hatano et al. ................. 714/719 |
| 5,572,468 A * | 11/1996 | Ishinabe et al. ........... 365/189.05 |
| 5,666,494 A * | 9/1997 | Mote, Jr. ........................ 711/167 |
| 5,864,567 A * | 1/1999 | Sato et al. ...................... 714/755 |
| 5,950,223 A * | 9/1999 | Chiang et al. ................. 711/105 |
| 6,035,371 A * | 3/2000 | Magloire ....................... 711/105 |
| 2001/0043500 A1 * | 11/2001 | Otsuka et al. ................. 365/222 |
| 2002/0018383 A1 * | 2/2002 | Akamatsu et al. ............ 365/201 |

OTHER PUBLICATIONS

"Understanding DRAM Operation". International Business Machines, Corp. 1996. pp. 1-10.*
"Memory Mobile FCRAM™ CMOS 64M-Bit (4M-word x 16-bit) Mobile Phone Application Specific Memory". MB82DBS04164E-70L. Fujitsu Microelectronics Limited. 2008-2009. pp. 1-64.*
"Numonyx StrataFlash Cellular Memory (M18-90nm/65nm)." Numonyx. Jun. 2009. <http://www.numonyx.com/Documents/Datasheets/309823_M18_Discrete_DS.pdff>.
Mobile FCRAM data sheet for MB82DBS04164E-70L. Fujitsu Microelectronics Limited. 2008-2009. <http://edevice.fujitsuu.com/jp/datasheet/j-jds/j511448.pdf>.

* cited by examiner

*Primary Examiner* — Thomas J Cleary
(74) *Attorney, Agent, or Firm* — McGinn IP Law Group, PLLC

(57) ABSTRACT

A control method of an information processing system including an address/data bus, the control method including: asserting a write enable signal indicating a write operation no later than an assertion of a latch control signal indicating an address latch timing in the write operation; asserting an output enable signal indicating a read operation after the address latch timing in the read operation; determine whether the write enable signal is asserted when the latch control signal is asserted; and starting the read or write operation according to the determined result no later than the address latch timing.

10 Claims, 10 Drawing Sheets

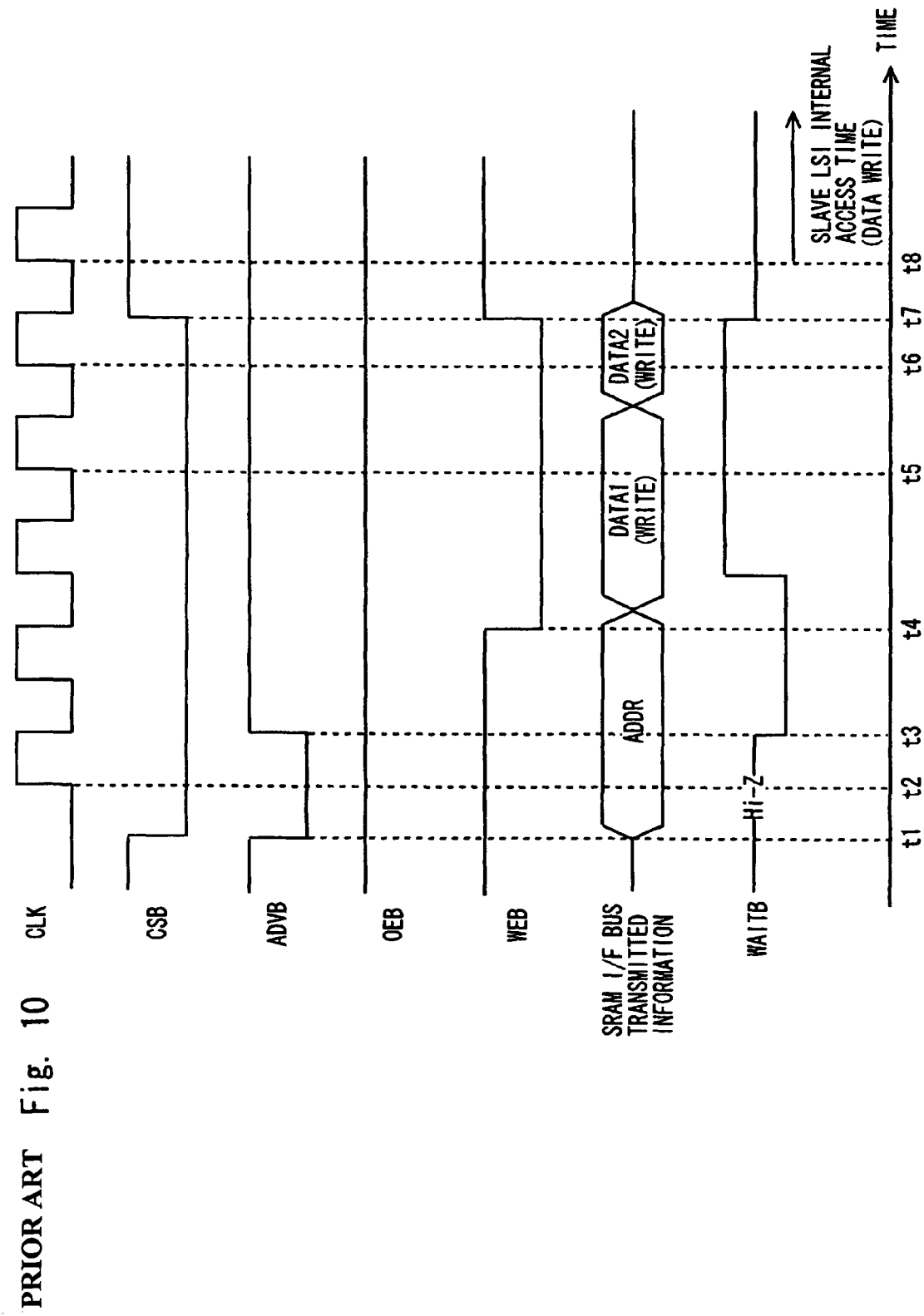
PRIOR ART Fig. 10

INFORMATION PROCESSING SYSTEM AND CONTROL METHOD THEREOF

INCORPORATION BY REFERENCE

This application is based upon and claims the benefit of priority from Japanese patent application No. 2009-232541, filed on Oct. 6, 2009, the disclosure of which is incorporated herein in its entirety by reference.

BACKGROUND

1. Field of the Invention

The present invention relates to an information processing system and a control method of the same.

2. Description of Related Art

FIG. 8 shows a block configuration of an information processing system 1 that is connected using an SRAM interface bus. Referring to FIG. 8, the information processing system 1 includes a master LSI 10, a slave LSI 20, ROM 30, and an SRAM interface bus 40.

The master LSI 10, the slave LSI 20 and the ROM 30 are connected to the SRAM interface bus 40. The SRAM interface bus 40 is an AD-mux SRAM interface bus in which an address signal and a data signal are transmitted through a common bus line. Various control signals, the address signal and the data signal in conformity with the AD-mux SRAM interface protocol are transmitted through the SRAM interface bus 40. Specifically, in the SRAM interface bus 40, it is inhibited that the address signal and the data signal are transmitted simultaneously.

The master LSI 10 controls the slave LSI 20 and the ROM 30. The master LSI 10 accesses the slave LSI 20 or the ROM 30 through the SRAM interface bus 40, and it can read data held by the slave LSI 20 or the ROM 30 or write data to the slave LSI 20 or the ROM 30.

For example, in the case of reading data held by the slave LSI 20 (which is referred to hereinafter as a read command), the master LSI 10 outputs an address signal ADDR and an activated address valid signal ADVB to the slave LSI 20 through the SRAM interface bus 40. After that, the master LSI 10 activates an output enable signal OEB and reads data corresponding to the address signal ADDR which is latched by the slave LSI 20 through the SRAM interface bus 40.

Further, in the case of writing data to the slave LSI 20 (which is referred to hereinafter as a write command), the master LSI 10 outputs an address signal ADDR and an activated address valid signal ADVB to the slave LSI 20. After that, the master LSI 10 activates a write enable signal WEB and outputs write data to the SRAM interface bus 40 corresponding to the address signal ADDR which is latched by the slave LSI 20.

Note that, in the case of reading data held by the ROM 30 also, the master LSI 10 performs basically the same operation as in the case of reading data held by the slave LSI 20.

Further, RAM 11 is connected externally to the master LSI 10. The master LSI 10 and the RAM 11 are connected through a DDR bus, for example. In the RAM 11, a memory address space which is managed by the master LSI 10 is mapped. Further, a peripheral LSI 12 is connected to the master LSI 10. The peripheral LSI 12 and the master LSI 10 are connected through a serial bus, for example.

In the ROM 30, programs, data or the like to be processed by the master LSI 10 are stored. The ROM 30 is accessed by the master LSI 10 through the SRAM interface bus 40, reads data or the like stored therein, and outputs the read data to the master LSI 10. For example, the ROM 30 receives an address signal ADDR and an activated address valid signal ADVB from the master LSI 110 and latches the value of the address signal ADDR. After that, the ROM 30 receives an activated output enable signal OEB, reads data corresponding to the value of the latched address signal ADDR, and outputs the read data to the SRAM interface bus 40. The ROM 30 is made of NOR flash memory, pseudo-SRAM or the like.

The slave LSI 20 is a processor that performs prescribed processing in response to a command from the master LSI 10, and it implements a part of the functions of the information processing system 1, such as communication protocol control or image processing, for example. The slave LSI 20 is under control of the master LSI 10. Then, by an access from the master LSI 10, the slave LSI 20 reads memory data under the slave LSI 20, which is described later, and sends the read data back, or writes write data from the master LSI 10 as memory data under the slave LSI 20.

Further, the slave LSI 20 includes a bus converter 21, a direct memory access circuit (DMA) 22, a processor 23, a memory controller (MEMC) 24, a peripheral circuit 25, and an internal bus 26. Furthermore, RAM 27 is connected externally to the slave LSI 20. The memory controller 24 is connected to the RAM 27 through a DDR bus, for example. The slave LSI 20 has an internal memory space, and the internal memory space includes a memory address space in the RAM 27 and a memory address space allocated to each circuit inside the slave LSI 20 such as the peripheral circuit 25 or a register. Hereinafter, data read from the internal memory space or data written to the internal memory space is referred to as memory data under the slave LSI 20.

The bus converter 21 performs protocol conversion that converts various kinds of signals from the SRAM interface bus 40 into signals conforming to the internal bus 26 of the slave LSI 20 or, reversely, converts various kinds of signals from the internal bus 26 into signals conforming to the SRAM interface bus 40. Further, the bus converter 21 may include a buffer that temporarily stores the value of the address signal or the value of the write data signal which is transmitted from the SRAM interface bus 40, a prefetch buffer that previously reads and stores data of the subsequent address on the basis of the value of the stored address signal or the like.

When a burst access is required for read data, for example, the direct memory access circuit (DMA) 22 reads the requested consecutive data from the RAM 27. The processor 23 controls the respective circuits of the slave LSI 20 and performs various kinds of requested processing operations. The memory controller 24 performs data reading, writing, refresh operation or the like on the RAM 27 connected thereto. The peripheral circuit 25 is a timer or the like, for example.

FIGS. 9 and 10 show timing charts to explain the internal operation of the slave LSI 20 of the information processing system 1 described above. First, FIG. 9 is a timing chart to explain the operation in which memory data under the slave LSI 20 is read by an access from the master LSI 10. Note that an external clock signal CLK, a chip select signal CSB, an address valid signal ADVB, an output enable signal OEB and a write enable signal WEB are output from the master LSI 10 and received by the slave LSI 20 through the SRAM interface bus 40. It is assumed that those signals are negative logic signals.

The external clock signal CLK for synchronous access is an operating clock of the bus converter 21. The chip select signal CSB is a signal for controlling a standby mode and a normal operation mode of the bus converter 21. The address valid signal ADVB is a signal for controlling the timing when the slave LSI 20 latches the address signal transmitted through the SRAM interface bus 40. The output enable signal OEB is a signal for controlling a data read operation on the slave LSI 20. The write enable signal WEB is a signal for controlling a data write operation on the slave LSI 20.

Further, a wait signal WAITB is output from the bus converter 21 and received by the master LSI 10 through the SRAM interface bus 40. It is also assumed that the wait signal WAITB is a negative logic signal. The wait signal WAITB is a signal for notifying the master LSI 10 that the slave LSI 20 is in a busy state.

Referring to FIG. 9, at time t1, the chip select signal CSB and the address valid signal ADVB from the master LSI 10 fall to the low level at the same time, for example. Further, the address signal ADDR that is output from the master LSI 10 is transmitted through the SRAM interface bus 40.

Because the chip select signal CSB falls to the low level at the time t1, the bus converter 21 changes from the standby mode to the normal operation mode. Then, at time t2, the external clock signal CLK rises. Because the address valid signal ADVB is the low level at this time, in synchronization with the rising edge of the external clock signal CLK, the bus converter 21 latches the address signal ADDR. The value of the latched address signal is stored into the buffer of the bus converter 21.

At time t3, the address valid signal ADVB rises. At the same time, the slave LSI 20 outputs the low-level wait signal WAITB to the master LSI 10.

At time t4, the output enable signal OEB falls. When the bus converter 21 receives the low-level output enable signal OEB, it determines that an access from the master LSI 10 is a read command, and the slave LSI 20 starts the read operation for reading memory data under the slave LSI 20 in accordance with the value of the latched address signal. Note that the memory data under the slave LSI 20 which is read by the slave LSI 20 includes register data generated or stored in the peripheral circuit 25, data stored in the external RAM 27 under control of the slave LSI 20 or the like.

Then, from time t5, the slave LSI 20 performs the read operation of the above-described memory data under the slave LSI 20. Assume that the read operation requires an internal access time Tacs which corresponds to four clocks of the external clock signal CLK. The internal access time Tacs includes various operation processing time inside the slave LSI 20, such as processing time to convert various signals from the SRAM interface bus 40 into signals conforming to the internal bus 26 of the slave LSI 20, time for the bus converter 21 to access the peripheral circuit 25 or the external RAM 27 through the internal bus 26, or time for an access issued by the bus converter 21 and an access issued by the processor 23 or the DMA 22 to contend in the internal bus 26 and wait, for example.

At time t6, which is after the lapse of the internal access time Tacs from the time t5, the read operation of the memory data under the slave LSI 20 is completed, and the wait signal WAITB rises. Then, at time t7, in synchronization with the rising edge of the external clock signal CLK, read data DATA1 is output from the bus converter 21 to the SRAM interface bus 40. Note that, when the read data is a burst access, read data DATA2 is output to the SRAM interface bus 40 continuously at time t8. Although only DATA1 and DATA2 are shown in FIG. 9, more read data may be output continuously.

Finally, at time t9, the output enable signal OEB and the chip select signal CSB rise to the high level at the same time, for example. The chip select signal CSB thereby becomes the high level, the bus converter 21 enters the standby mode, and a series of operations to read the memory data under the slave LSI 20 by an access from the master LSI 10 ends. Note that, in FIG. 9, the write enable signal WEB is always at the high level.

FIG. 10 is a timing chart to explain the operation in which write data DATA1 and write data DATA2 are written to memory data under the slave LSI 20 by an access from the master LSI 10. Note that the operation up to time t3 is the same as that of FIG. 9 and explanation thereof is omitted. However, when the bus converter 21 latches the address signal ADDR at the time t3, it sets the wait signal WAITB to the low level for a predetermined period from the latch operation.

At time t4, the write enable signal WEB falls. When the bus converter 21 receives the low-level write enable signal WEB, it determines that an access from the master LSI 10 is a write command, and the slave LSI 20 starts the write operation for writing write data into memory data under the slave LSI 20 in accordance with the value of the latched address signal. However, because the write data is not output from the master LSI 10 at this point of time, the write operation is not performed, and it enters a write data waiting mode. Specifically, at the time t4, the bus converter 21 can only perform a determination operation that determines to perform the write operation.

Then, when the write data DATA1 is output from the master LSI 10, in synchronization with the rising edge of the external clock signal CLK, the bus converter 21 latches the write data DATA1 at time t5, and writes the write data into the internal address space. Note that, when the write data is a burst access, the bus converter 21 latches write data DATA2 continuously at time t6 and then writes the write data into the internal address space.

At time t7, the write enable signal WEB and the chip select signal CSB rise to the high level at the same time, for example. Because the chip select signal CSB becomes the high level, the bus converter 21 enters the standby mode. After the subsequent time t8, an access inside the slave LSI 20 is started, and the write data DATA1 and DATA2 are written into the memory data under the slave LSI 20 in accordance with the value of the latched address signal. Note that, in the write operation in FIG. 10, the output enable signal OEB is always at the high level.

The timing charts similar to the above-described timing charts of FIGS. 9 and 10 are disclosed in "Numonyx StrataFlash Cellular Memory (M18-90nm/65nm)", Numonyx, Jun. 2009, and "Mobile FRCAM data sheet for MB82DBS04164E-70L", FUJITSU MICROELECTRONICS LIMITED, 2008-2009, respectively.

SUMMARY

As shown in FIG. 8, the slave LSI 20 and the ROM 30 are connected in parallel to the master LSI 10 through the SRAM interface bus 40. Therefore, as described in the read operation of FIG. 9, latency including the internal access time Tacs from when the master LSI 10 accesses the slave LSI 20 to when the read data is output to the SRAM interface bus 40 occurs. During the latency period, the SRAM interface bus 40 is occupied only for the access of the master LSI 10 and the slave LSI 20. Therefore, during the latency period, the master LSI 10 cannot access the ROM 30 and read the stored data, which raises an issue that the operating performance of the master LSI 10 is degraded. It is thus desirable to implement a mechanism for minimizing the latency from when the master LSI 10 accesses the slave LSI 20 to when the read data is output to the SRAM interface bus 40.

A first exemplary aspect of the present invention is a control method of an information processing system including an address/data bus, the control method comprising: asserting a write enable signal indicating a write operation no later than an assertion of a latch control signal indicating an address latch timing in the write operation; asserting an output enable signal indicating a read operation after the address latch timing in the read operation; determining whether the write enable signal is asserted when the latch control signal is asserted; and starting the read or write operation according to the determined result no later than the address latch timing.

A second exemplary aspect of the present invention is an information processing system comprising: an interface bus that is coupled to an external storage circuit and has an address line and a data line in common; a slave controller that is coupled to the interface bus and performs a data read operation or a data write operation on an internal memory space in accordance with a value of an address signal transmitted through the interface bus when a latch control signal for controlling latch timing of the address signal is activated; and a master controller that is coupled to the interface bus and outputs, to the slave controller, the address signal, the latch control signal, an output enable signal to be activated after a predetermined period from the latch timing of the address signal and causing, when activated, the slave controller to determine the data read operation on the internal memory space for the data read operation of the slave controller, and a write enable signal causing, when activated, the slave controller to determine the data write operation on the internal memory space for the data write operation of the slave controller, wherein when the master controller requests the data write operation on the internal memory space, the master controller activates the write enable signal no later than the slave controller latches the address signal, and when the write enable signal is in a deactivated state at a time of latching the address signal, the slave controller performs determination of the data read operation regardless of the output enable signal.

According to the exemplary aspects of the present invention, the slave controller can perform determination of the data read operation regardless of the output enable signal that is activated after a predetermined period from the latch timing of the address signal, and, when activated, causes determination of the data read operation on the internal memory space. It is thereby possible to make determination of the data read operation before the output enable signal is activated, thus allowing the data read operation to be started early. This enables reduction of the period during which the interface bus is occupied for the access of the master controller and the slave controller. In this manner, it is possible to reduce the period during which the interface bus is occupied by the master controller and the slave controller and thereby ensure the accessible time of the master controller and the storage circuit, which leads to an increase in the throughput capacity of the information processing system.

In the information processing system according to the above exemplary aspects of the present invention, it is possible to increase the throughput capacity.

BRIEF DESCRIPTION OF THE DRAWINGS

The above and other exemplary aspects, advantages and features will be more apparent from the following description of certain exemplary embodiments taken in conjunction with the accompanying drawings, in which:

FIG. 10 is a timing chart to explain a data write operation of a slave LSI according to related art (external clock synchronous operation).

DETAILED DESCRIPTION OF THE EXEMPLARY EMBODIMENTS

[First Exemplary Embodiment]

Figure 1:
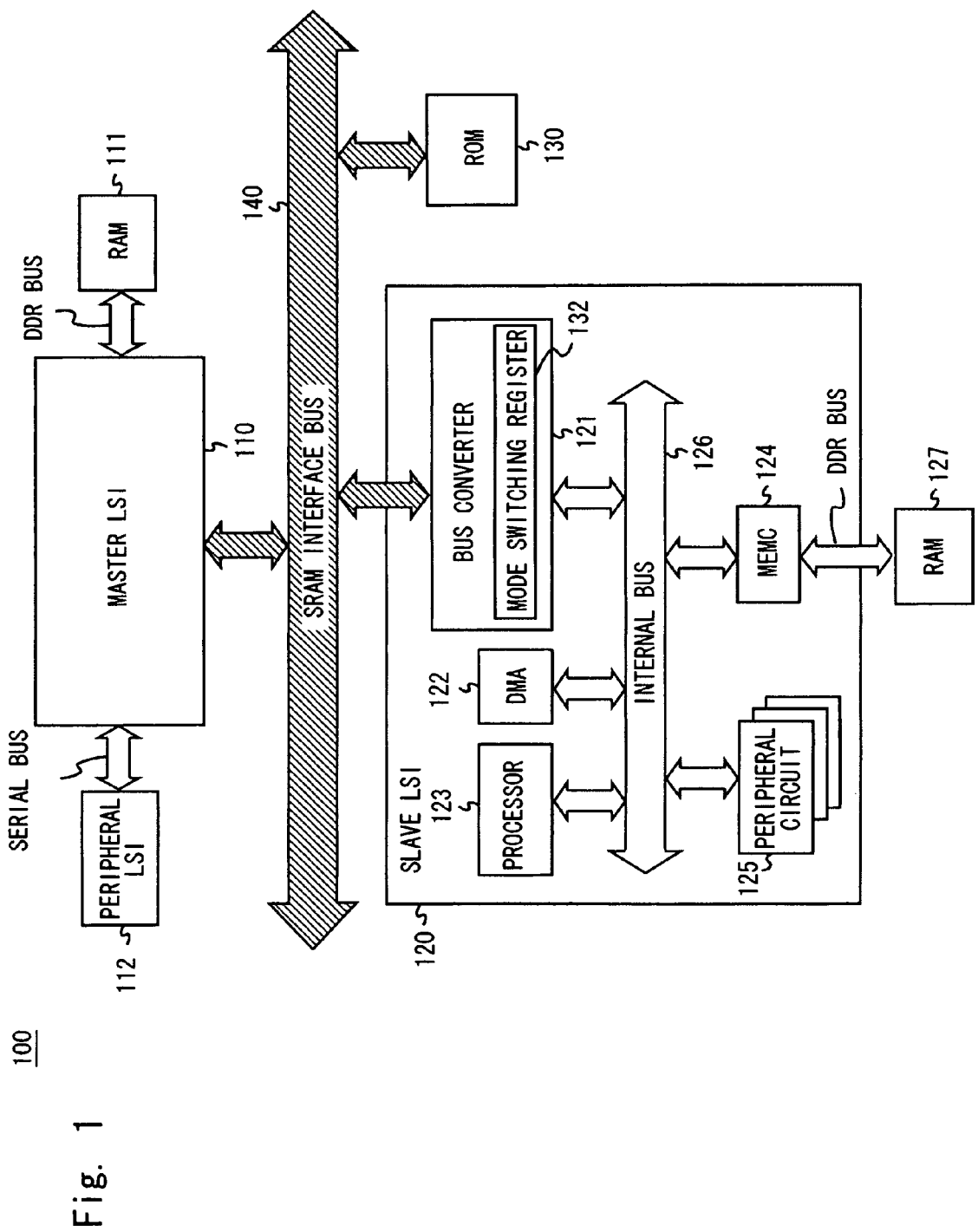
FIG. 1 is an example of a block configuration of an information processing system according to an exemplary embodiment.

A first exemplary embodiment of the present invention is described hereinafter in detail with reference to the drawings. FIG. 1 shows an example of a block configuration of an information processing system 100 according to the first exemplary embodiment. The information processing system 100 includes a master LSI 110, a slave LSI 120, ROM 130, and an SRAM interface bus 140. In this manner, the information processing system 100 constitutes a system in which a plurality of LSIs (the ROM 130 is also regarded as one LSI) are integrated, and the plurality of LSIs are connected through the SRAM interface bus 140.

The master LSI 110, the slave LSI 120 and the ROM 130 are connected to the SRAM interface bus 140. The SRAM interface bus 140 is an AD-mux SRAM interface bus in which an address signal and a data signal are transmitted through a common bus line. Various control signals, the address signal and the data signal in conformity with the AD-mux SRAM interface protocol are transmitted through the SRAM interface bus 140. Specifically, in the SRAM interface bus 140, it is inhibited that the address signal and the data signal are transmitted simultaneously.

The master LSI 110 controls the slave LSI 120 and the ROM 130. The master LSI 110 accesses the slave LSI 120 or the ROM 130 through the SRAM interface bus 140, and it can read data held by the slave LSI 120 or the ROM 130 or write data to the slave LSI 120 or the ROM 130.

For example, in the case of reading memory data under the slave LSI 120 (which is referred to hereinafter as a read command as appropriate), the master LSI 110 outputs an address signal ADDR and an activated address valid signal ADVB to the slave LSI 120 through the SRAM interface bus 140. After that, the master LSI 110 activates an output enable signal OEB and outputs data corresponding to the address signal ADDR which is latched by the slave LSI 120 through the SRAM interface bus 140, and inputs a data signal transmitted through the SRAM interface bus 140.

Note that, in the case of reading data held by the ROM 130 also, the master LSI 110 performs basically the same operation as in the case of reading data held by the slave LSI 120.

Further, in the case of writing data to memory data under the slave LSI 120 (which is referred to hereinafter as a write command), the master LSI 110 outputs an address signal ADDR, an activated address valid signal ADVB, and an activated write enable signal WEB to the SRAM interface bus 140. Note that, as described later, the timing to activate the write enable signal WEB is no later than the time when the slave LSI 120 latches the address signal ADDR. After that, the master LSI 110 outputs a write data signal corresponding to the address signal ADDR which is latched by the slave LSI 120 to the SRAM interface bus 140. During this period, the output enable signal OEB is always in the deactivated state. Thus, activation and deactivation of the output enable signal OEB serve as a trigger for switching the input/output direction of the data signal or the address signal transmitted through the SRAM interface bus 140 for the master LSI 110.

Further, RAM 111 is connected externally to the master LSI 110. The master LSI 110 and the RAM 111 are connected through a DDR bus, for example. In the RAM 111, a memory address space which is managed by the master LSI 110 is mapped. Further, a peripheral LSI 112 is connected to the master LSI 110. The peripheral LSI 112 and the master LSI 110 are connected through a serial bus, for example. The peripheral LSI 112 may be a power supply LSI or the like, for example. Further, although not shown in FIG. 1, the master LSI 110 includes a processor, an internal bus, a bus converter that connects the SRAM interface bus 140 and the internal bus, a memory controller that connects the internal bus and the RAM 111 and so on, which are integrated.

In the ROM 130, programs, data or the like to be processed by the master LSI 110 are stored. The ROM 130 is accessed by the master LSI 110 through the SRAM interface bus 140, reads data or the like stored therein, and outputs the read data to the master LSI 110. For example, the ROM 130 receives an address signal ADDR and an activated address valid signal ADVB from the master LSI 110 and latches the value of the address signal ADDR. After that, the ROM 130 receives an activated output enable signal OEB, reads data corresponding to the value of the latched address signal ADDR, and outputs the read data to the SRAM interface bus 140. Further, other than the ROM 130, NOR flash memory, pseudo-SRAM, OneNAND or the like may be connected to the SRAM interface bus 140.

Further, the slave LSI 120 includes a bus converter 121, a direct memory access circuit (DMA) 122, a processor 123, a memory controller (MEMC) 124, a peripheral circuit 125, and an internal bus 126. Further, RAM 127 is connected externally to the slave LSI 120.

The slave LSI 120 is a processor that performs prescribed processing according to a command from the master LSI 110, and it implements a part of the functions of the information processing system 100, such as communication protocol control or image processing, for example. The slave LSI 120 is under control of the master LSI 110. Then, in response to an access from the master LSI 110, the slave LSI 120 reads memory data under itself, and sends the read data back, or writes write data from the master LSI 110 into memory data under itself. The slave LSI 120 has an internal memory space, and the internal memory space includes a memory address space in the RAM 127 and a memory address space allocated to each circuit inside the slave LSI 120 such as the peripheral circuit 125 or a register. Hereinafter, data read from the internal memory space or data written to the internal memory space is referred to as memory data under the slave LSI 120. Note that the memory data under the slave LSI 120 includes register data generated or stored in the peripheral circuit 125, data stored in the external RAM 127 under control of the slave LSI 120 or the like.

In the slave LSI 120, the bus converter 121 receives an address signal ADDR and an activated address valid signal ADVB from the bus converter 121 and latches the value of the address signal ADDR. Then, at the same time as the latch operation, the bus converter 121 detects the activation state of the output enable signal OEB and the write enable signal WEB, and, according to the detection result, determines whether an access from the master LSI 110 is a read command or a write command. Specifically, when the output enable signal OEB and the write enable signal WEB are both in the deactivated state, the bus converter 121 determines that an access from the master LSI 110 is a read command. Further, when the output enable signal OEB is in the deactivated state and the write enable signal WEB is in the activated state, the bus converter 121 determines that an access from the master LSI 110 is a write command.

When the bus converter 121 determines that an access from the master LSI 110 is a read command, the slave LSI 120 reads memory data under the slave LSI 120 in accordance with the value of the latched address signal ADDR and, after activation of the output enable signal OEB, outputs the read data to the SRAM interface bus 140.

On the other hand, when the bus converter 121 determines that an access from the master LSI 110 is a write command, the slave LSI 120 waits for a write data signal from the master LSI 110 and, when the write data signal is transmitted, the slave LSI 120 latches the value of the write data signal and writes it into memory data under the slave LSI 120.

The RAM 127 is connected to the slave LSI 120 through a DDR bus, for example. In the RAM 127, a memory address space which is managed by the slave LSI 120 is mapped, for example. It is assumed that the data in the memory address space includes a program code of the processor 123 which is loaded from the ROM 130 to the RAM 127 by the master LSI 110 and data generated by each circuit in the slave LSI 120.

The bus converter 121 performs protocol conversion that converts various kinds of signals from the SRAM interface bus 140 into signals conforming to the internal bus 126 of the slave LSI 120 or, reversely, converts various kinds of signals from the internal bus 126 into signals conforming to the SRAM interface bus 140. Further, the bus converter 121 makes determination as to whether an access from the master LSI 110 is a read command or a write command. Furthermore, the bus converter 121 may include a buffer that temporarily stores the value of the address signal or the value of the write data signal which is transmitted from the SRAM interface bus 140, a prefetch buffer that previously reads and stores data of the subsequent address on the basis of the value of the stored address signal or the like.

Further, the bus converter 121 includes a mode switching register 132. The mode switching register 132 stores information for switching the determination timing to determine whether an access from the master LSI 110 is a read command or a write command. For example, when the value of the mode switching register 132 is a first state (e.g. when the value is "0"), the determination timing is at the time of latching the address signal as described above, and when it is a second state (e.g. when the value is "1"), the determination timing is at the same time as described in related art shown in FIGS. 9 and 10. However, when there is no need to switch the determination timing as to whether an access from the master LSI 110 is a read command or a write command in the system of the information processing system 100, the mode switching register 132 may be eliminated.

The direct memory access circuit (DMA) 122 performs data transfer between the RAM 127 and the RAM 127 or between the RAM 127 and the peripheral circuit 125, for example. The processor 123 controls the respective circuits of the slave LSI 120 and performs various kinds of requested processing operations. The memory controller (MEMC) 124 performs data reading, writing, refresh operation or the like on the RAM 127 connected thereto. The MEMC 124 is connected to the RAM 127 through a DDR bus, for example. The peripheral circuit 125 is a timer or the like, for example.

Figure 2:
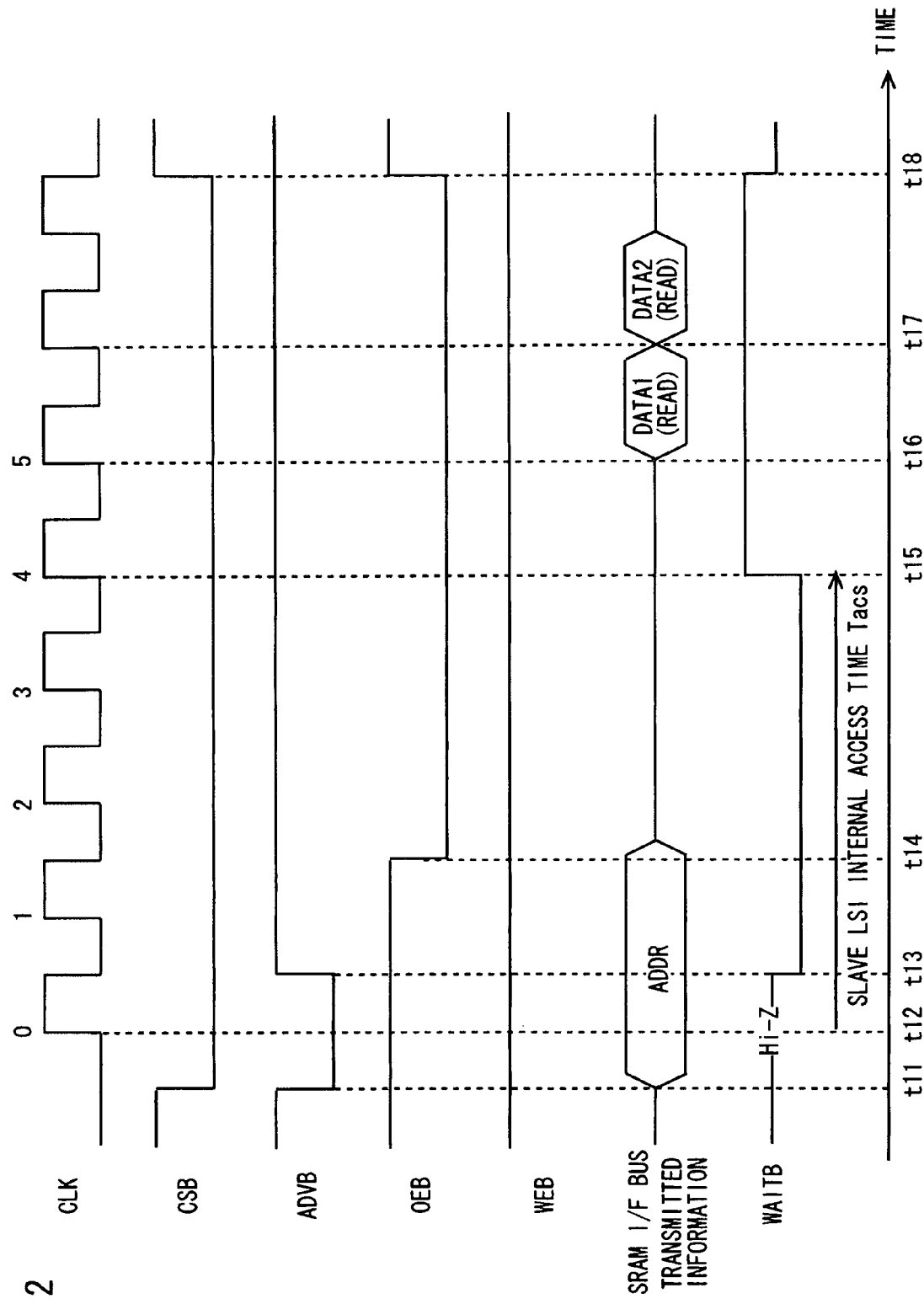
FIG. 2 is a timing chart to explain a data read operation of a slave LSI according to an exemplary embodiment (external clock synchronous operation)
Figure 3:
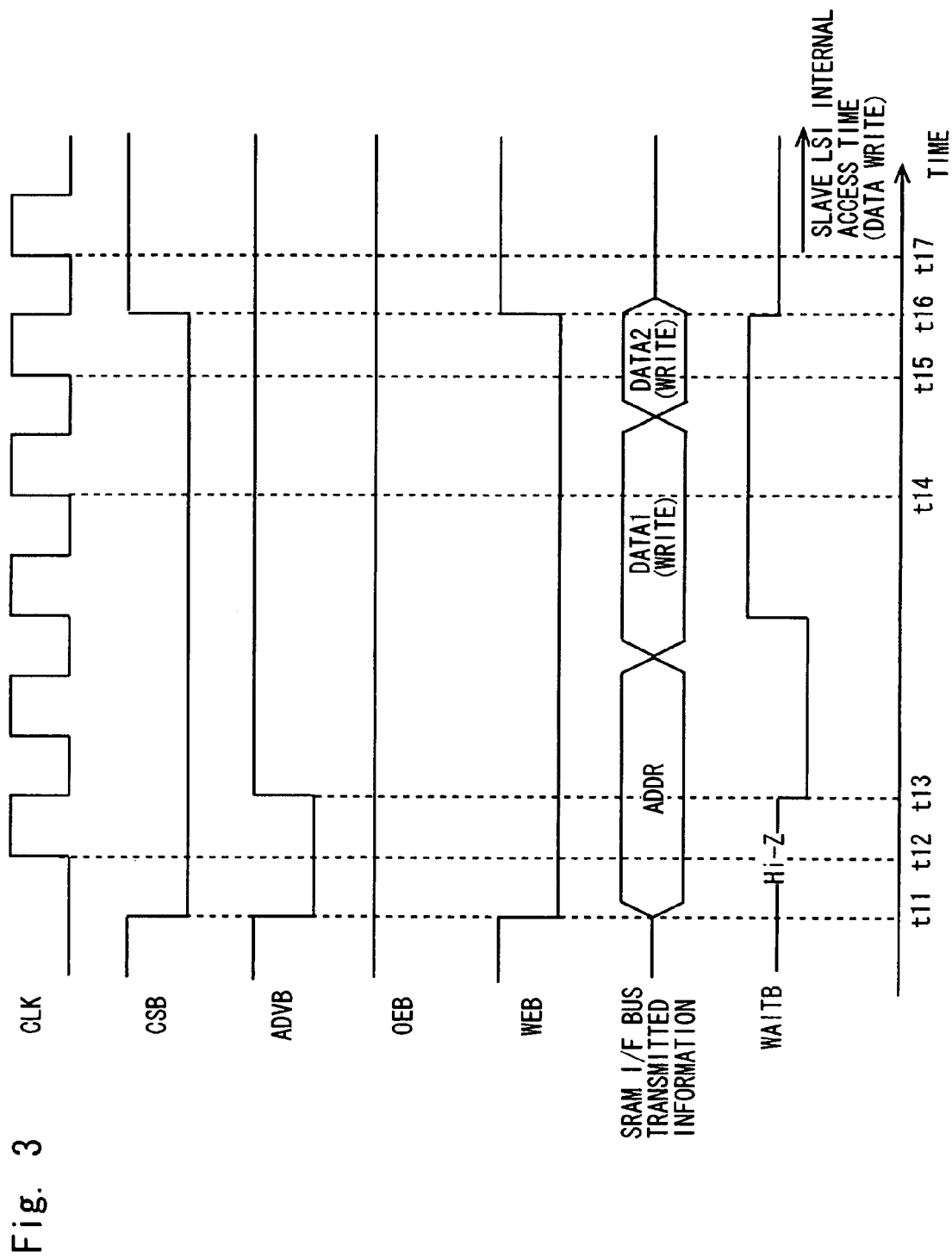
FIG. 3 is a timing chart to explain a data write operation of a slave LSI according to an exemplary embodiment (external clock synchronous operation)

FIGS. 2 and 3 show timing charts to explain the internal operation of the slave LSI 120 of the information processing system 100. First, FIG. 2 is a timing chart to explain the operation in which memory data under the slave LSI 120 is read by an access from the master LSI 110.

The external clock signal CLK for synchronous access is an operating clock of the bus converter 121, and it is output from the master LSI 110. The chip select signal CSB is a signal for controlling the standby mode and the normal operation mode of the bus converter 121. The address valid signal ADVB is a signal for controlling the timing when the slave LSI 120 latches the address signal transmitted through the SRAM interface bus 140. The output enable signal OEB is a signal for controlling the data read operation on the slave LSI 120. The write enable signal WEB is a signal for controlling the data write operation on the slave LSI 120. The chip select signal CSB, the address valid signal ADVB, the output enable signal OEB and the write enable signal WEB are output from the master LSI 110.

Further, a wait signal WAITB is output from the bus converter 121 and received by the master LSI 110 through the SRAM interface bus 140. It is also assumed that the wait signal WAITB is a negative logic signal. The wait signal WAITB is a signal for notifying the master LSI 110 that the slave LSI 120 is in a busy state.

Referring to FIG. 2, at time t11, the chip select signal CSB and the address valid signal ADVB from the master LSI 110 fall to the low level at the same time, for example. Further, the address signal ADDR that is output from the master LSI 110 is transmitted through the SRAM interface bus 140.

Because the chip select signal CSB falls to the low level at the time t11, the bus converter 121 changes from the standby mode to the normal operation mode. Then, at time t12, the external clock signal CLK rises. Because the address valid signal ADVB is the low level, in synchronization with the rising edge of the external clock signal CLK, the bus converter 121 latches the address signal ADDR. The value of the latched address signal is stored into the buffer of the bus converter 121.

Further, at the same time, the bus converter 121 monitors signal levels of the output enable signal OEB and the write enable signal WEB. Then, when the output enable signal OEB and the write enable signal WEB are both at the high level (deactivated state), the bus converter 121 determines that an access from the master LSI 110 is a read command, and the slave LSI 120 starts the read operation for reading memory data under the slave LSI 120 in accordance with the value of the latched address signal. It is assumed that the read operation of the memory data under the slave LSI 120 requires the internal access time Tacs which corresponds to four clocks of the external clock signal CLK as the internal access time of the slave LSI 120. Therefore, the slave LSI 120 performs the above-described read operation of the memory data under the slave LSI 120 from time t12 to time t15, which is after the lapse of the internal access time Tacs. The internal access time Tacs includes various operation processing time inside the slave LSI 120, such as processing time to convert various signals from the SRAM interface bus 140 into signals conforming to the internal bus 126 of the slave LSI 120, time for the bus converter 121 to access the peripheral circuit 125 or the external RAM 127 through the internal bus 126, or time for an access issued by the bus converter 121 and an access issued by the processor 123 or the DMA 122 to contend in the internal bus 126 and wait, for example.

At time t13, the address valid signal ADVB rises. At the same time, the slave LSI 120 outputs the low-level wait signal WAITB to the master LSI 110.

At time t14, the output enable signal OEB falls. It should be noted that, differently from the slave LSI 20 according to related art, the slave LSI 120 has already started the read operation of the memory data under the slave LSI 120 at the time t11.

At time t15, which is after the lapse of the internal access time Tacs from the time t12, the read operation of the memory data under the slave LSI 120 is completed, and the wait signal WAITB rises. Then, at time t16, in synchronization with the rising edge of the external clock signal CLK, read data DATA1 is output from the slave LSI 120 to the SRAM interface bus 140. Note that, when the read data is a burst access, read data DATA2 is output to the SRAM interface bus 140 continuously at time t17. Although only DATA1 and DATA2 are shown in FIG. 2, more read data may be output continuously.

Finally, at time t18, the output enable signal OEB and the chip select signal CSB rise to the high level at the same time, for example. The chip select signal CSB thereby becomes the high level, the bus converter 121 enters the standby mode, and a series of operations to read the memory data under the slave LSI 120 by an access from the master LSI 110 ends. Note that, in FIG. 2, the write enable signal WEB is always at the high level.

FIG. 3 is a timing chart to explain the operation in which write data DATA1 and write data DATA2 are written to memory data under the slave LSI 120 by an access from the master LSI 110. Referring to FIG. 3, at time t11, the chip select signal CSB, the address valid signal ADVB and the write enable signal WEB from the master LSI 110 fall to the low level at the same time, for example. Further, the address signal ADDR that is output from the master LSI 110 is transmitted through the SRAM interface bus 140.

Because the chip select signal CSB falls to the low level at the time t11, the bus converter 121 changes from the standby mode to the normal operation mode. Then, at time t12, the external clock signal CLK rises. Because the address valid signal ADVB is the low level, in synchronization with the rising edge of the external clock signal CLK, the bus converter 121 latches the address signal ADDR.

Further, at the same time, the bus converter 121 monitors signal levels of the output enable signal OEB and the write enable signal WEB. Then, when the output enable signal OEB is at the high level (deactivated state) and the write enable signal WEB is at the low level (activated state), the bus converter 121 determines that an access from the master LSI 110 is a write command. Then, the slave LSI 120 starts the write operation for writing write data into memory data under the slave LSI 120 in accordance with the value of the latched address signal. However, because the write data is not output from the master LSI 110 at this point of time, the write operation is not performed, and it enters the write data waiting mode. Specifically, at the time t12, the slave LSI 120 can only perform the determination operation that determines to perform the write operation.

At time t13, the address valid signal ADVB rises. Further, the slave LSI 120 outputs the low-level wait signal WAITB to the master LSI 110 during a predetermined period of time.

Then, when the write data DATA1 is output from the master LSI 110, in synchronization with the rising edge of the external clock signal CLK, the bus converter 121 latches the write data DATA1 at time t14. Note that, when the write data is a burst access, the bus converter 121 latches write data DATA2 continuously at time t15.

At time t16, the write enable signal WEB and the chip select signal CSB rise to the high level at the same time, for example. Because the chip select signal CSB becomes the high level, the bus converter 121 enters the standby mode. After the subsequent time t17, an access inside the slave LSI 120 is started, and the write data DATA1 and DATA2 are written into the memory data under the slave LSI 120 in accordance with the value of the latched address signal. Note that, in the write operation in FIG. 3, the output enable signal OEB is always at the high level.

The read operation and the write operation of the slave LSI 120 by an access from the master LSI 110 are described above.

In the information processing system 1 according to related art, in the case of writing write data into memory data under the slave LSI 120 by an access from the master LSI 110, the write enable signal WEB is changed to the activated state after the address valid signal ADVB is changed from the activated state to the deactivated state.

Figure 9:
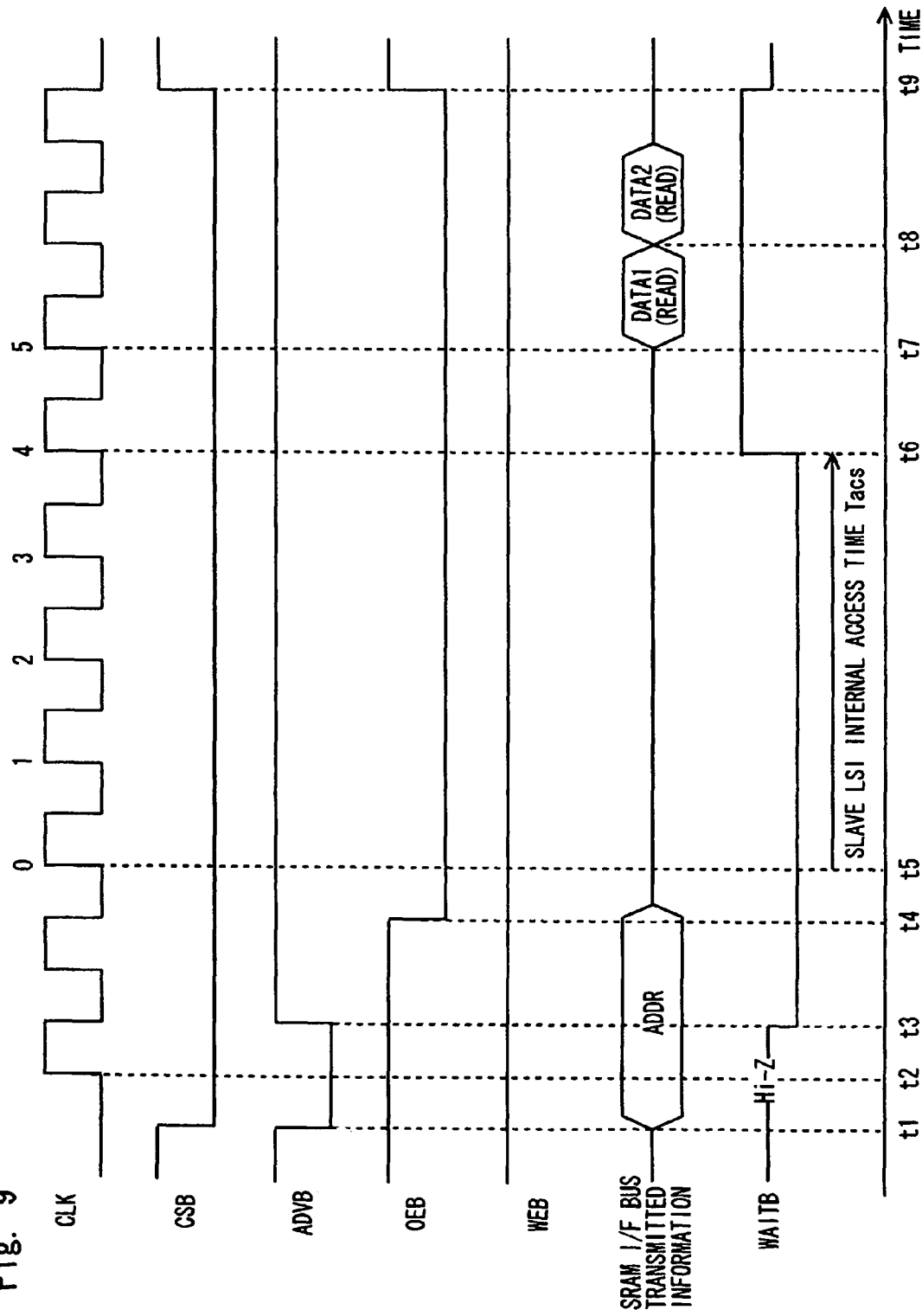
FIG. 9 is a timing chart to explain a data read operation of a slave LSI according to related art (external clock synchronous operation)

Further, in the case of reading memory data under the slave LSI 120 by an access from the master LSI 110, the output enable signal OEB remains in the deactivated state until the address valid signal ADVB is changed from the activated state to the deactivated state. This is because the SRAM interface bus 40 is the AD-mux type in which the address signal and the data signal are transmitted through a common bus line, and data output from the slave LSI 20 or the ROM 30 is inhibited when the address signal or the write data signal is output from the master LSI 10. Therefore, the timing to activate the output enable signal OEB cannot be changed, and the slave LSI 20 needs to start the read operation of memory data under the slave LSI 20 from the time t5, which is after the activation of the output enable signal OEB as shown in FIG. 9.

In this manner, in the information processing system 1 according to related art, it cannot be determined whether an access from the master LSI 110 is a read command or a write command at the timing to latch the address signal ADDR, and it is necessary to wait for the activation of the output enable signal OEB or the write enable signal WEB.

Therefore, when memory data under the slave LSI 120 is read by an access from the master LSI 110, a long period of latency including the internal access time Tacs until read data is output from the slave LSI 20 occurs. In this manner, the access latency from the master LSI to the slave LSI is not fixed, which is different from the access latency to ROM or RAM, and a significantly longer time is required compared to the access latency from the master LSI to ROM or RAM. During the period when the latency is occurring, the SRAM interface bus 40 is occupied only for the access of the master LSI 10 and the slave LSI 20. As a result, during the period of latency, the master LSI 10 cannot access the ROM 30 and read the stored data, which raises an issue that the operating performance of the master LSI 10 is degraded.

On the other hand, in the information processing system 100 according to the exemplary embodiment, at the timing of latching the address signal ADDR at the time t12 as shown in FIG. 2, it is determined whether an access from the master LSI 110 is a read command or not, and the read operation of memory data under the slave LSI 120 is started. This is made possible by making the activation timing of the write enable signal WEB in the case where an access from the master LSI 110 is a write command earlier than the timing in the information processing system 1 according to related art. Specifically, as shown in the timing chart of FIG. 3, the activation timing of the write enable signal WEB is adjusted so that it does not get behind at least the timing of latching the address signal ADDR.

In this manner, by adjusting the activation timing of the write enable signal WEB, it is possible to make determination as to whether an access from the master LSI 110 is a read command or not at the timing to latch the address signal ADDR. For example, when the output enable signal OEB and the write enable signal WEB are both in the deactivated state at the timing to latch the address signal ADDR, it can be determined that an access from the master LSI 110 is a read command. On the other hand, when the output enable signal OEB is in the deactivated state and the write enable signal WEB is in the activated state at the timing to latch the address signal ADDR, it can be determined that an access from the master LSI 110 is a write command. As a result, the slave LSI 120 can start the read operation of memory data under the slave LSI 120 at the timing to latch the address signal ADDR.

Comparison between the timing charts of FIGS. 2 and 9 is as follows. There is no difference in the internal access time Tacs between the information processing system 1 and the information processing system 100. However, the information processing system 100 performs determination as to whether an access from the master LSI 110 is a read command or not at the timing to latch the address signal ADDR (the time t12 in FIG. 2). Therefore, in the information processing system 100, the read operation of memory data under the slave LSI 120 can be reduced by the length of time corresponding to the period from the time t2 to the time t5 of FIG. 9, compared to the information processing system 1. Consequently, the period during which the SRAM interface bus 140 is occupied only for the access of the master LSI 110 and the slave LSI 120 can be reduced, which enables improvement in the operating performance of the master LSI 110.

Further, because an existing signal line is used, it is possible to increase the read operation speed of the information processing system 100 with no need for adding a control signal or increasing the number of external terminals or the number of signal lines of the LSI. It is thereby possible to increase the throughput capacity of the information processing system 100 without an increase in the chip redesign cost or the chip area due to an increase in the number of terminals or lines.

Furthermore, as described above, the bus converter 121 may include the mode switching register 132, so that the operation of the timing charts shown in FIGS. 2 and 3 (which is referred to hereinafter as a first operation mode) and the operation of the timing charts shown in FIGS. 9 and 10 (which is referred to hereinafter as a second operation mode) can be switched according to the value stored in the mode switching register 132. The value of the mode switching register 132 is set by the master LSI 110. Note that, various signals that are output from the master LSI 110 according to the set value of the mode switching register 132 correspond to the first and second operation modes as a matter of course.

[Second Exemplary Embodiment]

A second exemplary embodiment of the present invention is described hereinafter in detail with reference to the drawings. Although the case where an access from the master LSI 110 is processed in synchronous with the external clock signal CLK for synchronous access is described in the first exemplary embodiment, the case where it is asynchronous with the external clock signal CLK is described in the second exemplary embodiment. The block configuration is the same as that of the information processing system 100 shown in FIG. 1 and thus not redundantly described.

Figure 4:
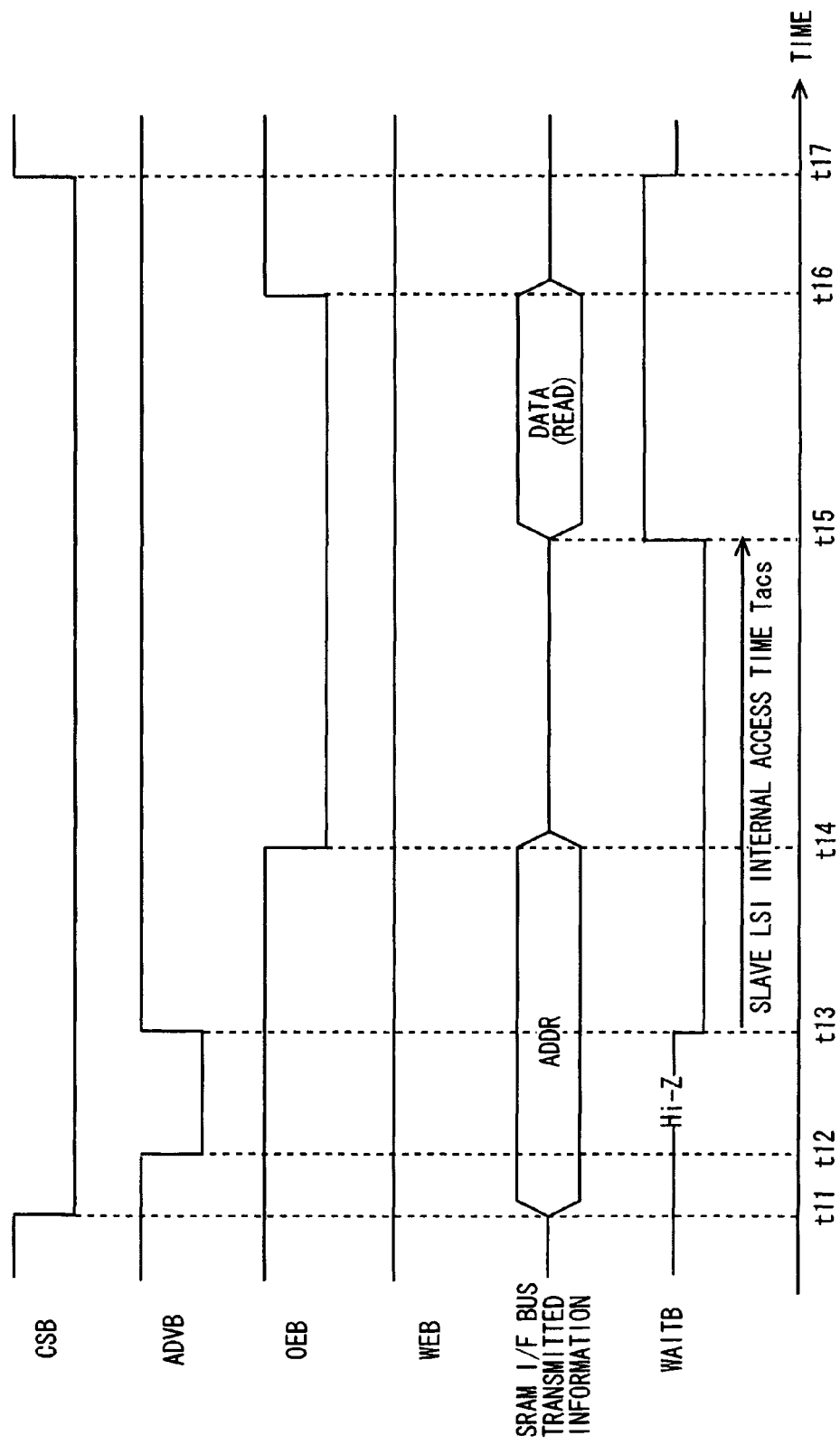
FIG. 4 is a timing chart to explain a data read operation in an information processing system according to related art (external clock asynchronous operation)
Figure 5:
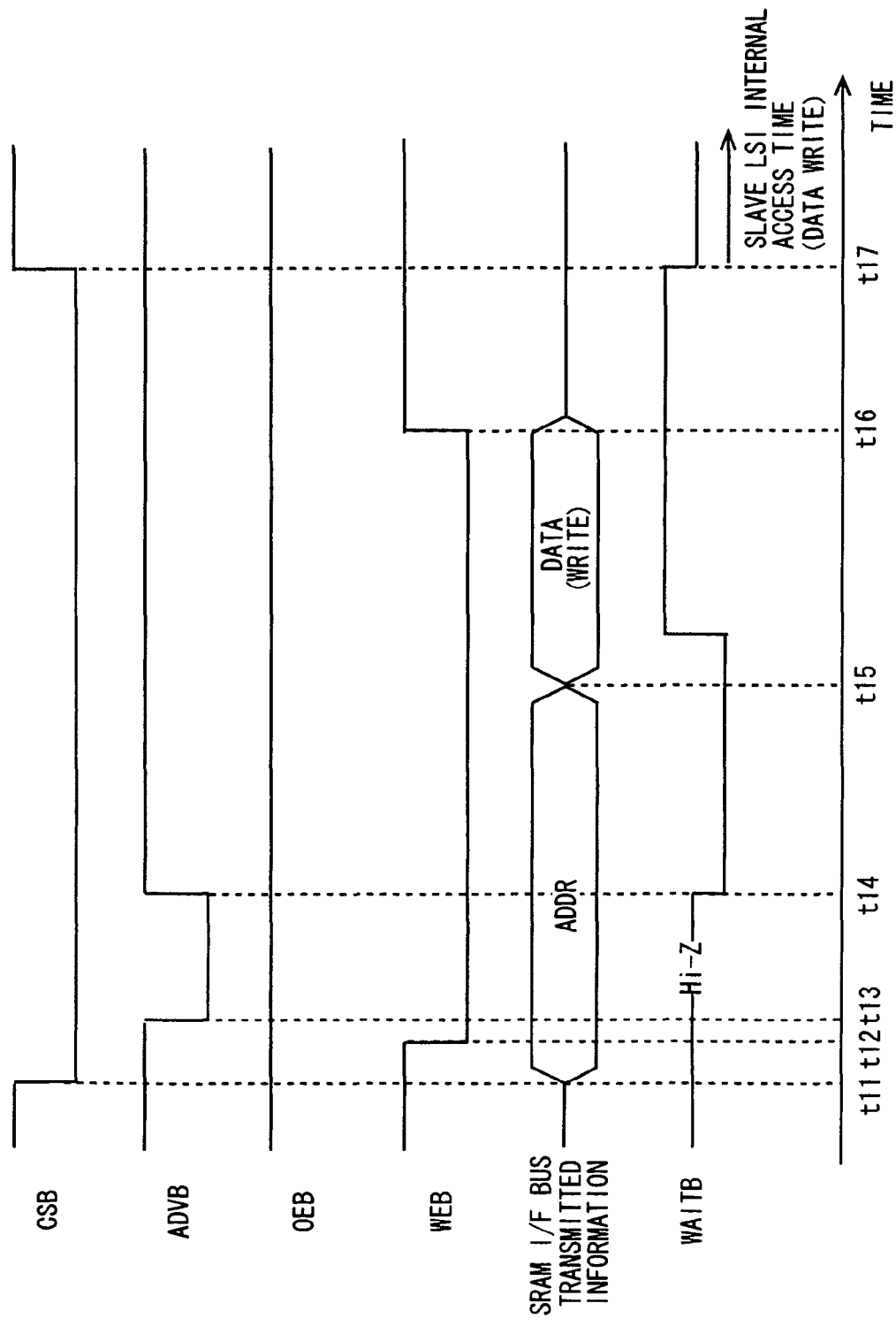
FIG. 5 is a timing chart to explain a data write operation in an information processing system according to related art (external clock asynchronous operation)

FIGS. 4 and 5 show timing charts to explain the internal operation of the slave LSI 120 of the information processing system 100 according to the second exemplary embodiment. First, FIG. 4 is a timing chart to explain the operation in which memory data under the slave LSI 120 is read by an access from the master LSI 110.

The chip select signal CSB is a signal for controlling the standby mode and the normal operation mode of the bus converter 121. The address valid signal ADVB is a signal for controlling the timing when the bus converter 121 latches the address signal transmitted through the SRAM interface bus 140. The output enable signal OEB is a signal for controlling the data read operation on the slave LSI 120. The write enable signal WEB is a signal for controlling the data write operation on the slave LSI 120. In the second exemplary embodiment, differently from the first exemplary embodiment, the address latch timing is not at the rising edge of the external clock signal CLK but at the rising edge of the address valid signal ADVB.

Further, a wait signal WAITB is output from the bus converter 121 and received by the master LSI 110 through the SRAM interface bus 140. It is also assumed that the wait signal WAITB is a negative logic signal. The wait signal WAITB is a signal for notifying that the slave LSI 120 is in a busy state.

Referring to FIG. 4, at time t11, the chip select signal CSB from the master LSI 110 falls to the low level. Further, the address signal ADDR that is output from the master LSI 110 is transmitted through the SRAM interface bus 140. Because the chip select signal CSB falls to the low level at the time 111, the bus converter 121 changes from the standby mode to the normal operation mode.

At time t12, the address valid signal ADVB falls to the low level. Then, at time t13, the address valid signal ADVB rises to the high level. In synchronization with the rising edge of the address valid signal ADVB, the bus converter 121 latches the address signal ADDR.

Further, at the same time, the bus converter 121 monitors signal levels of the output enable signal OEB and the write enable signal WEB. Then, when the output enable signal OEB and the write enable signal WEB are both at the high level (deactivated state), the bus converter 121 determines that an access from the master LSI 110 is a read command, and the slave LSI 120 starts the read operation for reading memory data under the slave LSI 120 in accordance with the value of the latched address signal. It is assumed that the read operation of the memory data under the slave LSI 120 requires the internal access time Tacs of the same period as described in FIG. 9. Therefore, the slave LSI 120 performs the read operation of the memory data under the slave LSI 120, which is the same as described in the first exemplary embodiment, from time t13 to time t15, which is after the lapse of the internal access time Tacs. During the read operation of the memory data under the slave LSI 120, the low-level wait signal WAITB is output to the master LSI 110.

At time t14, the output enable signal OEB falls. At the time t15, which is after the internal access time Tacs from the time t13, the read operation of the memory data under the slave LSI 120 is completed, and the wait signal WAITB rises. Then, the read data DATA is output from the slave LSI 120 to the SRAM interface bus 140.

At time t16, the output enable signal OEB rises to the high level, and, finally at time t17, the chip select signal CSB becomes the high level. The chip select signal CSB thereby becomes the high level, the bus converter 121 enters the standby mode, and a series of operations to read the memory data under the slave LSI 120 by an access from the master LSI 110 ends. Note that, in FIG. 4, the write enable signal WEB is always at the high level.

FIG. 5 is a timing chart to explain the operation in which write data DATA is written to memory data under the slave LSI 120 by an access from the master LSI 110. Referring to FIG. 5, at time t11, the chip select signal CSB from the master LSI 110 falls to the low level. Further, the address signal ADDR that is output from the master LSI 110 is transmitted through the SRAM interface bus 140. Because the chip select signal CSB falls to the low level at the time t11, the bus converter 121 changes from the standby mode to the normal operation mode.

At time t12, the write enable signal WEB falls to the low level. Then, at time t13, the address valid signal. ADVB falls to the low level. Further, at time t14, the address valid signal ADVB rises to the high level. In synchronization with the rising edge of the address valid signal ADVB, the bus converter 121 latches the address signal ADDR. Then, the bus converter 121 sets the wait signal WAITB to the low level for a predetermined period from the latch operation.

Further, at the same time, the bus converter 121 monitors signal levels of the output enable signal OEB and the write enable signal WEB. Then, when the output enable signal OEB is at the high level (deactivated state) and the write enable signal WEB is at the low level (activated state), the bus converter 121 determines that an access from the master LSI 110 is a write command. Then, the slave LSI 120 starts the write operation for writing write data into memory data under the slave LSI 120 in accordance with the value of the latched address signal. However, because the write data is not output from the master LSI 110 at this point of time, the write operation is not performed, and it enters the write data waiting mode. Specifically, at the time t14, the slave LSI 120 can only perform the determination operation that determines to perform the write operation.

At time t15, the write data DATA is output from the master LSI 110 to the SRAM interface bus 140. Then, at time t16, the write enable signal WEB rises. In synchronization with the rising edge of the write enable signal WEB, the bus converter 121 latches the write data DATA.

At time t17, the chip select signal CSB rises to the high level, and the bus converter 121 enters the standby mode. After the subsequent time t17, an access inside the slave LSI 120 is started, and the write data DATA is written into the memory data under the slave LSI 120 in accordance with the value of the latched address signal. Note that, in the write operation in FIG. 5, the output enable signal OEB is always at the high level.

The read operation and the write operation of the slave LSI 120 by an access from the master LSI 110 according to the second exemplary embodiment are described above.

Figure 6:
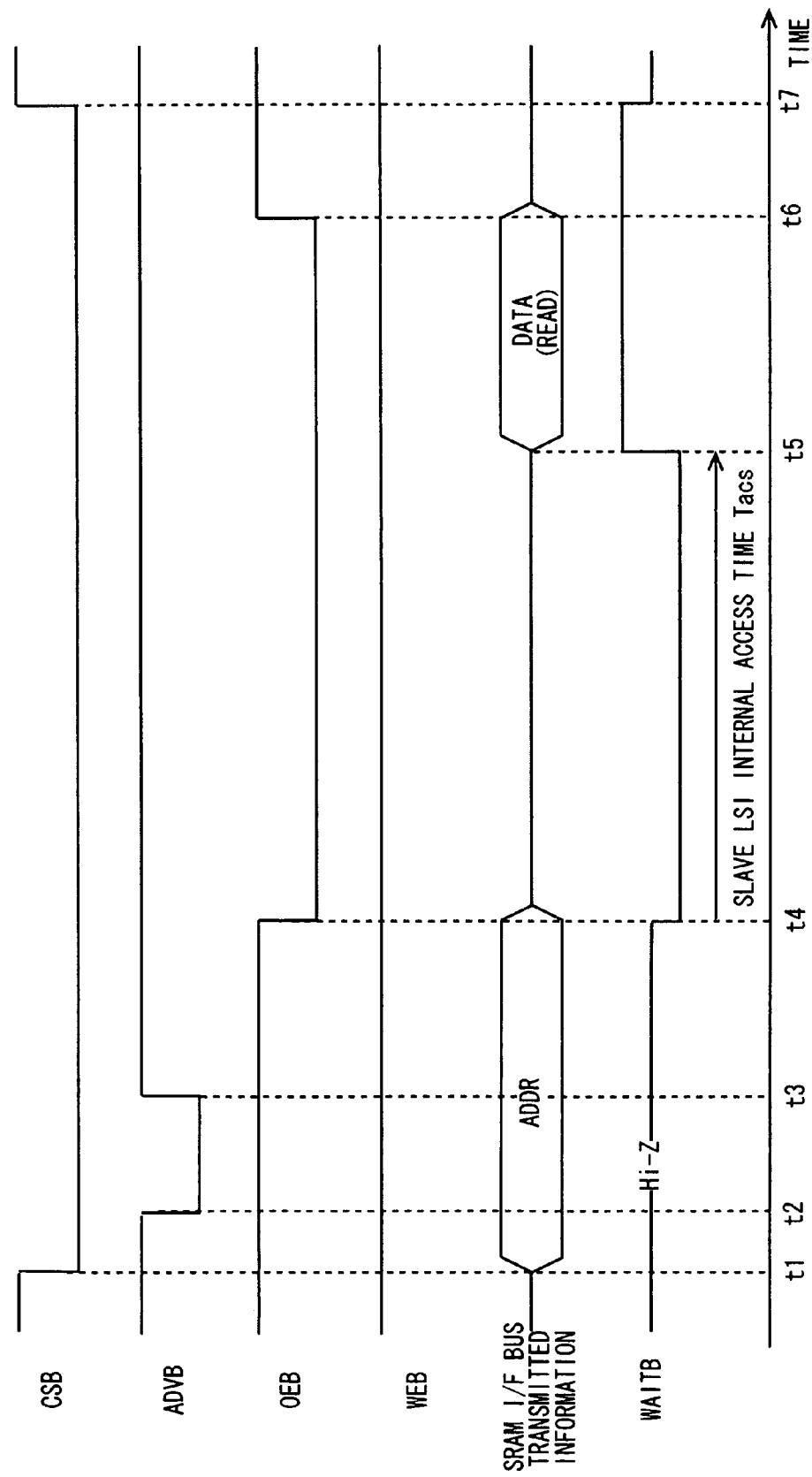
FIG. 6 is a timing chart to explain a data read operation of a slave LSI according to an exemplary embodiment (external clock asynchronous operation)
Figure 7:
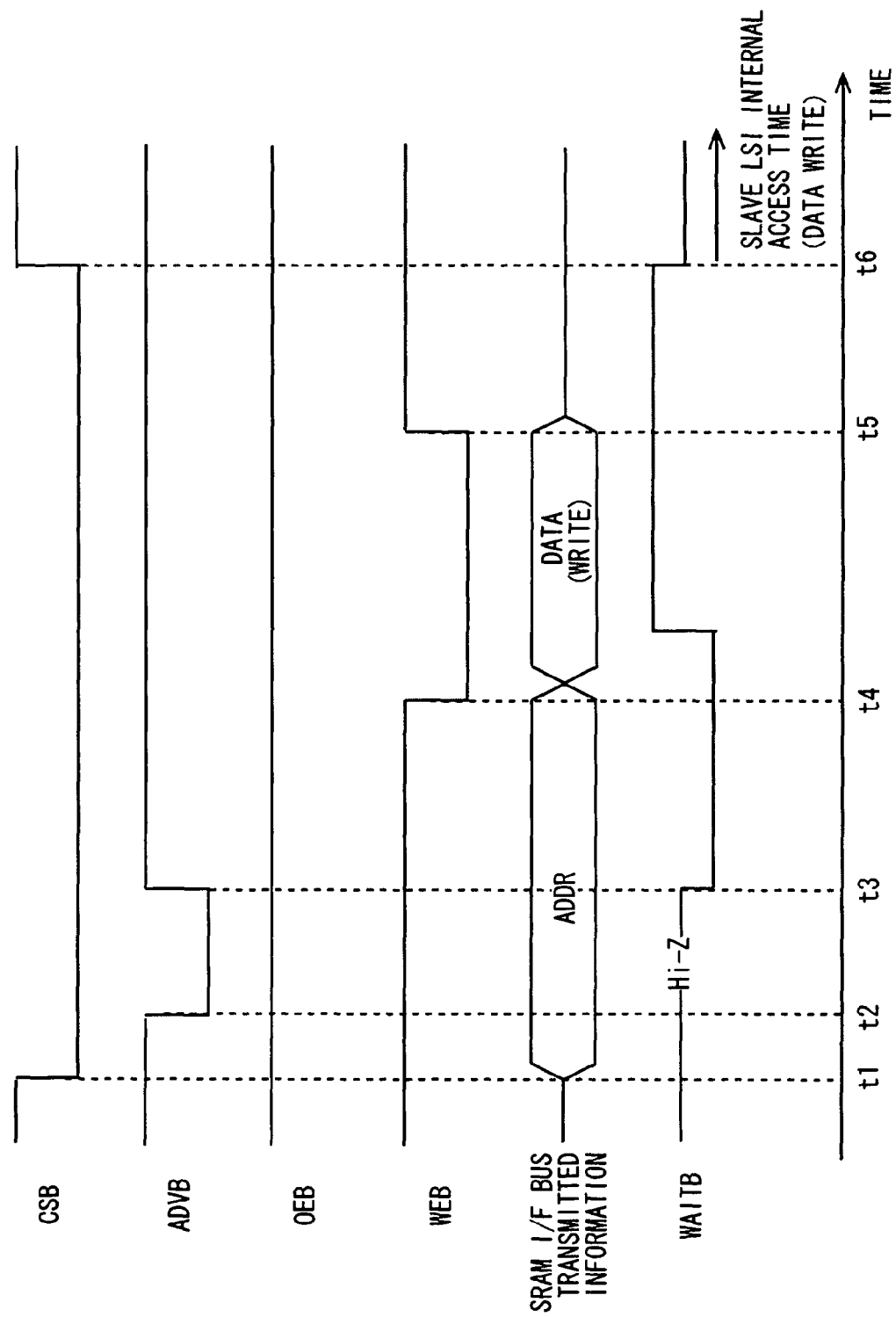
FIG. 7 is a timing chart to explain a data write operation of a slave LSI according to an exemplary embodiment (external clock asynchronous operation)
Figure 8:
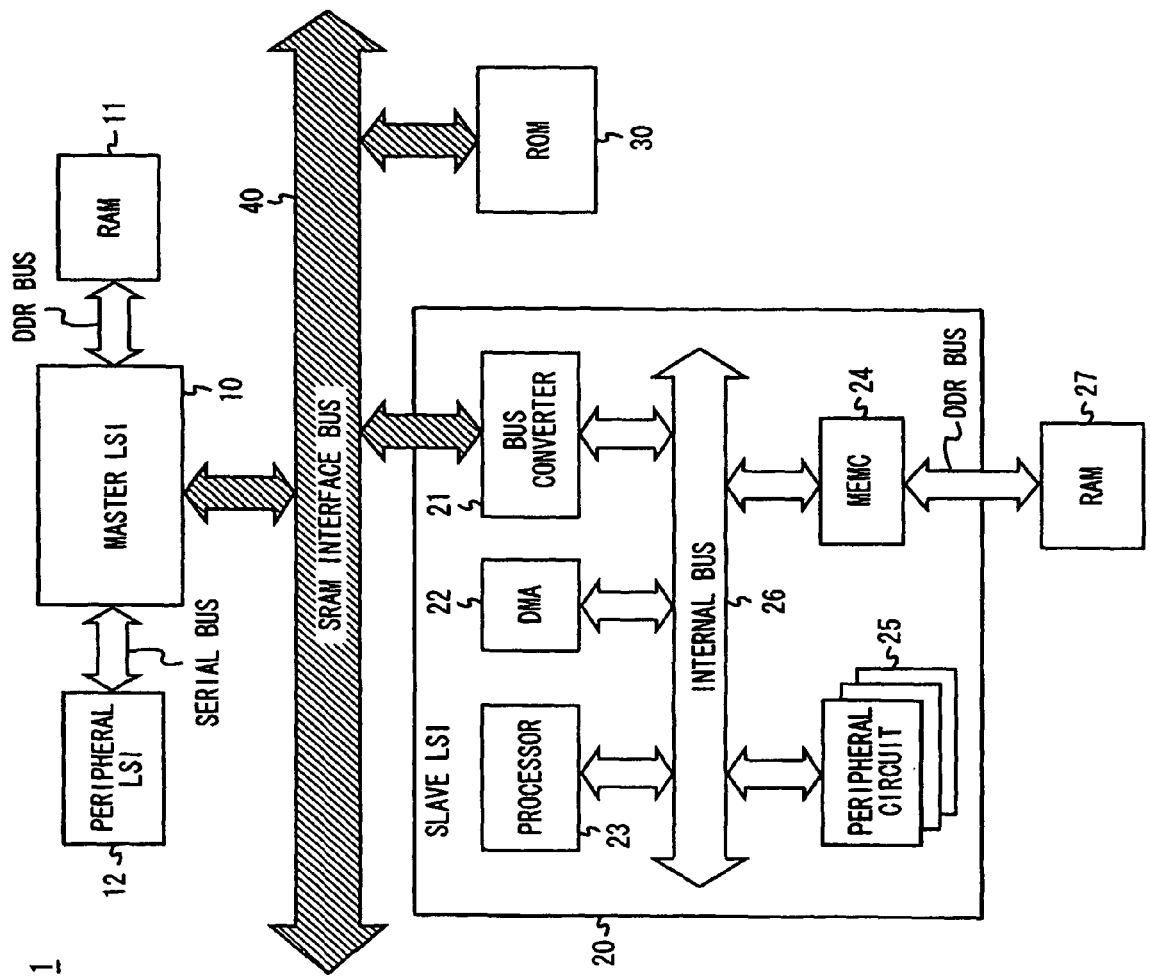
FIG. 8 is an example of a block configuration of an information processing system according to related art.

FIGS. 6 and 7 show timing charts when an access from the master LSI 110 is processed in asynchronous with the external clock signal CLK for synchronous access in the information processing system 1 according to related art, and a difference from the second exemplary embodiment is described. First, FIG. 6 is a timing chart to explain the operation in which memory data under the slave LSI 120 is read by an access from the master LSI 110.

Referring to FIG. 6, at time t1, the chip select signal CSB from the master LSI 10 falls to the low level. Further, the address signal ADDR that is output from the master LSI 10 is transmitted through the SRAM interface bus 40. Because the chip select signal CSB falls to the low level at the time t1, the bus converter 21 changes from the standby mode to the normal operation mode.

At time t2, the address valid signal ADVB falls to the low level. Then, at time t3, the address valid signal ADVB rises to the high level. In synchronization with the rising edge of the address valid signal ADVB, the bus converter 21 latches the address signal ADDR.

Then, at time t4, the output enable signal OEB falls to the low level. The bus converter 21 receives the low-level output enable signal OEB and determines that an access from the master LSI 10 is a read command, and starts the read operation for reading memory data under the slave LSI 20 in accordance with the value of the latched address signal. The read operation of the memory data under the slave LSI 20 requires the internal access time Tacs of the same period as described in FIG. 9. Therefore, the slave LSI 20 performs the read operation of the memory data under the slave LSI 20, which is the same as described in the first exemplary embodiment, from time t4 to time t5, which is after the lapse of the internal access time Tacs. During the read operation of the memory data under the slave LSI 20, the low-level wait signal WAITB is output to the master LSI 10.

At the time t5, which is after the internal access time Tacs from the time t4, the read operation of the memory data under the slave LSI 20 is completed, and the wait signal WAITB rises. Then, the read data DATA is output from the slave LSI 20 to the SRAM interface bus 40.

At time t6, the output enable signal OEB rises to the high level, and, finally at time t7, the chip select signal CSB becomes the high level. The chip select signal CSB thereby becomes the high level, the bus converter 21 enters the standby mode, and a series of operations to read the memory data under the slave LSI 20 by an access from the master LSI 10 ends. Note that, in FIG. 6, the write enable signal WEB is always at the high level.

FIG. 7 is a timing chart to explain the operation in which write data DATA is written to memory data under the slave LSI 20. Note that the operation up to the time t3 is the same as that of FIG. 9 and thus node redundantly described. However, when the bus converter 21 latches the address signal ADDR at the time t3, it sets the wait signal WAITB to the low level for a predetermined period from the latch operation.

At time t4, the write enable signal WEB falls. When the slave LSI 20 receives the low-level write enable signal WEB, it determines that an access from the master LSI 10 is a write command, and the slave LSI 20 starts the write operation for writing write data into memory data under the slave LSI 20 in accordance with the value of the latched address signal. However, because the write data is not output from the master LSI 10 at this point of time, the write operation is not performed, and it enters the write data waiting mode. Specifically, at the time t4, the slave LSI 20 can only perform the determination operation that determines to perform the write operation.

After that, the write data DATA is output from the master LSI 10 to the SRAM interface bus 40. Then, at time t5, the write enable signal WEB rises. In synchronization with the rising edge of the write enable signal WEB, the bus converter 21 latches the write data DATA.

At time t6, the chip select signal CSB rises to the high level, and the bus converter 21 enters the standby mode. After the subsequent time t6, an access inside the slave LSI 20 is started, and the write data DATA is written into the memory data under the slave LSI 20 in accordance with the value of the latched address signal. Note that, in the write operation in FIG. 7, the output enable signal OEB is always at the high level.

Comparison between the timing charts of FIGS. 4 and 6 is as follows. There is no difference in the internal access time Tacs between the information processing system 1 and the information processing system 100. However, the information processing system 100 performs determination as to whether an access from the master LSI 110 is a read command or not at the timing to latch the address signal ADDR (the time t13 in FIG. 4). Therefore, in the information processing system 100, the read operation of memory data under the slave LSI 120 can be reduced by the length of time corresponding to the period from the time t3 to the time t4 of FIG. 6, compared to the read operation of memory data under the slave LSI 20 in the information processing system 1.

As a result, even when an access from the master LSI 110 is processed in asynchronous with the external clock signal CLK for synchronous access, it is possible to reduce the period during which the SRAM interface bus 140 is occupied only for the access of the master LSI 110 and the slave LSI 120 and improve the operating performance of the master LSI 110 in the same manner as in the first exemplary embodiment. The other advantageous effects are also the same as those of the first exemplary embodiment.

It should be noted that the present invention is not limited to the above-described exemplary embodiments, and various changes and modifications may be made without departing from the scope of the invention. For example, although the timing when the write enable signal WEB falls to the low level coincides with the timing when the address valid signal ADVB falls in FIG. 3, it may be no later than the timing of latching the address signal ADDR. For example, the timing when the write enable signal WEB falls may be before the time t12 in FIG. 3 or before the time t13 in FIG. 5. This is because the determination as to whether an access from the master LSI 110 is a read command or a write command is performed at the timing to latch the address signal ADDR in the present invention.

Further, although the latch operation of the address signal ADDR and the determination operation as to whether an access is a read command or a write command are performed at the rising edge of the address valid signal ADVB (the time t13 in FIG. 4 and the time t14 in FIG. 5) in the second exemplary embodiments, it may be performed at the falling edge of the address valid signal ADVB (the time t12 in FIG. 4 and the time t13 in FIG. 5). However, the activation timing of the write enable signal WEB is set before the falling edge of the address valid signal ADVB.

While the invention has been described in terms of several exemplary embodiments, those skilled in the art will recognize that the invention can be practiced with various modifications within the spirit and scope of the appended claims and the invention is not limited to the examples described above.

Further, the scope of the claims is not limited by the exemplary embodiments described above.

Furthermore, it is noted that, Applicant's intent is to encompass equivalents of all claim elements, even if amended later during prosecution.

The first and second exemplary embodiments can be combined as desirable by one of ordinary skill in the art.

What is claimed is:

1. A control method of an information processing system including an address/data bus, the control method comprising:

asserting a write enable signal indicating a write operation no later than an assertion of a latch control signal indicating an address latch timing in the write operation;

asserting an output enable signal indicating a read operation after the address latch timing in the read operation;

determining whether the write enable signal is asserted when the latch control signal is asserted; and starting the read or write operation according to the determined result no later than the address latch timing.

2. An information processing system comprising:

an interface bus including an address/data bus having an address line and a data line in common, the interface bus being configured to transmit at least a latch control signal indicating an address latch timing, a write enable signal indicating a write operation and an output enable signal indicating a read operation;

a master controller coupled to the interface bus and configured to assert the write enable signal no later than an assertion of the latch control signal in the write operation; and a slave controller coupled to the interface bus and configured to start the read or write operation based on the write enable signal no later than the address latch timing.

3. The information processing system according to claim 2, wherein the slave controller checks whether the write enable signal is asserted when the latch control signal is asserted, and determines that the master controller requests the read operation when the write enable signal is not assert.

4. The information processing system according to claim 3, wherein the slave controller determines that the master controller requests the write operation when the write enable signal is asserted.

5. The information processing system according to claim 4, wherein the slave controller checks whether the write enable signal is asserted no later than the latch timing of the address signal.

6. The information processing system according to claim 5, wherein the interface bus is an SRAM interface bus.

7. The information processing system according to claim 5, wherein the slave controller performs latch of the address signal and determination of the data read operation in synchronization with an external operating clock from the master controller.

8. The information processing system according to claim 5, wherein the slave controller performs latch of the address signal and determination of the data read operation in synchronization with timing of a transition from deactivation to activation of the latch control signal or timing of a transition from activation to deactivation of the latch control signal.

9. The information processing system according to claim 5, wherein the slave controller includes a mode switching register that stores a value controlled by the master controller, if the value stored in the mode switching register is a first state, the slave controller performs determination of the data read operation regardless of the output enable signal when the write enable signal is in a deactivated state at a time of latching the address signal, and if the value stored in the mode switching register is a second state, the slave controller performs determination of the data read operation when the output enable signal is activated.

10. An information processing system comprising:

an interface bus that is coupled to an external storage circuit and has an address line and a data line in common;

a slave controller that is coupled to the interface bus and performs a data read operation or a data write operation on an internal memory space in accordance with a value of an address signal transmitted through the interface bus when a latch control signal for controlling latch timing of the address signal is activated; and a master controller that is coupled to the interface bus and outputs, to the slave controller, the address signal, the latch control signal, an output enable signal to be activated after a predetermined period from the latch timing of the address signal and causing, when activated, the slave controller to determine the data read operation on the internal memory space for the data read operation of the slave controller, and a write enable signal causing, when activated, the slave controller to determine the data write operation on the internal memory space for the data write operation of the slave controller, wherein when the master controller requests the data write operation on the internal memory space, the master controller activates the write enable signal no later than the slave controller latches the address signal, and when the write enable signal is in a deactivated state at a time of latching the address signal, the slave controller performs determination of the data read operation regardless of the output enable signal.

* * * * *